United States Patent
Draemel et al.

(10) Patent No.: US 6,171,476 B1
(45) Date of Patent: Jan. 9, 2001

(54) CAVITATION ENHANCED LIQUID ATOMIZATION

(75) Inventors: Dean C. Draemel, Kingwood, TX (US); Nicholas C. Nahas, Chatham; Teh Chung Ho, Bridgewater, both of NJ (US)

(73) Assignee: Exxon Research and Engineering Company, Florham Park, NJ (US)

( * ) Notice: Under 35 U.S.C. 154(b), the term of this patent shall be extended for 0 days.

(21) Appl. No.: 09/271,707

(22) Filed: Mar. 18, 1999

(51) Int. Cl.$^7$ .................................................. L10G 35/10
(52) U.S. Cl. ..................... 208/157; 208/127; 208/158; 208/163
(58) Field of Search ........................... 208/157; 239/431, 239/433

(56) References Cited

U.S. PATENT DOCUMENTS

| | | | |
|---|---|---|---|
| 4,784,328 | 11/1988 | Skraba ................................. | 239/432 |
| 5,173,175 | 12/1992 | Steffens et al. ...................... | 208/157 |
| 5,289,976 | 3/1994 | Dou et al. ............................ | 239/431 |
| 6,003,789 | 12/1999 | Base et al. ........................... | 239/433 |

*Primary Examiner*—Helane E. Myers
(74) *Attorney, Agent, or Firm*—Gerard J. Hughes; Michael A. Cromwell

(57) ABSTRACT

A cavitation enhanced atomizing process comprises forming a flowing solution of the liquid to be atomized and a lower boiling cavitating liquid. This flowing solution is then contacted with a pressure reducing means, at a temperature below the bubble point of the cavitating liquid in the solution, to produce cavitation bubbles. These bubbles comprise cavitation liquid vapor and the bubble nucleation produces a two-phase fluid of the bubbles and liquid solution. The two-phase fluid is passed downstream into and through an atomizing means, such as an orifice, and into a lower pressure atomizing zone, in which the bubbles vaporize to form a spray of liquid droplets. The nucleated bubbles also grow in size as the so-formed two-phase fluid passes downstream to and through the atomizing means.

7 Claims, 2 Drawing Sheets

CAVITATION ENHANCED LIQUID ATOMIZATION

BACKGROUND OF THE DISCLOSURE

1. Field of the Invention

The invention relates to cavitation enhanced liquid atomization. More particularly, the invention relates to atomizing a fluid comprising a solution of the liquid to be atomized and a lower boiling cavitation liquid, by contacting the fluid under pressure and while flowing, with a pressure reducing means to reduce the fluid pressure and thereby produce nucleation and growth of bubbles comprising vapor of the cavitation liquid in the fluid, at a temperature below the bubble point of the solution, and then passing the fluid through an atomizing means into a lower pressure atomizing zone. Bubble nucleation is induced upstream of the atomizing means. This is useful for atomizing a hot FCC feed oil into a catalytic cracking reaction zone, using a lower boiling hydrocarbon as the cavitation liquid.

2. Background of the Invention

Fluid atomization is well known and used in a wide variety of applications and processes. These include, for example, aerosol sprays, the application of pesticides and coatings, spray drying, humidification, mixing, air conditioning, and chemical and petroleum refinery processes. For most applications, a fluid under pressure, with or without the assistance of an atomizing gas, is forced through a pressure reducing orifice in an atomization nozzle. Atomization occurs as the fluid passes through the orifice and into the lower pressure zone downstream. The degree of atomization is determined by the orifice size, the pressure drop across the orifice, fluid density, viscosity, and surface tension, etc., as is known. Atomization is increased and the droplet size is decreased, with decreasing orifice size and increasing pressure drop. Atomizing relatively viscous fluids at high flow rates, such as the heavy petroleum oil feeds used in fluidized catalytic cracking (FCC) processes, or fluid cat cracking as it is also called, is particularly challenging. FCC is an established and widely used process in the petroleum refining industry, primarily for converting high boiling petroleum oils to more valuable lower boiling products, including gasoline and middle distillates such as kerosene, jet and diesel fuel, and heating oil. In an FCC process, the preheated oil feed is mixed with steam or a low molecular weight (e.g., $C_{4-}$) gas under pressure, to form a two phase, gas and liquid fluid. This fluid is passed through a pressure-reducing orifice into a lower pressure atomization zone, in which the gas expands and the oil is atomized, and brought into contact with a particulate, hot cracking catalyst. The atomization is effected primarily by the shearing action between the gas and liquid phases, as the fluid passes through the orifice and into the lower pressure atomization zone. The FCC riser comprises both the feed atomization zone and the cat cracking zone. Steam is more often used than a light hydrocarbon gas, to reduce the vapor loading on the on the gas compression facilities and the downstream products fractionation. However, the use of steam produces sour water, which enhances corrosion. Sour water is also environmentally unfriendly and must therefore be treated before disposal. There is a need therefore, for a process that either reduces or eliminates the amount of steam or low molecular weight gas atomizing agents.

SUMMARY OF THE INVENTION

The invention relates to a liquid atomizing process in which a fluid comprising a solution of the liquid to be atomized and a lower boiling cavitation liquid, is contacted under pressure and while flowing, with a pressure reducing means to reduce the fluid pressure and thereby produce nucleation of bubbles comprising the cavitation liquid vapor in the fluid, at a temperature below the bubble point of the solution, and then passing the fluid through an atomizing means into a lower pressure atomizing zone. Thus, the cavitation bubbles comprise vapor of the cavitation liquid. Nucleation of the cavitation bubbles produces a two-phase fluid comprising the vapor bubbles and the liquid solution. While bubble nucleation is produced upstream of the atomizing means, typically and preferably both nucleation and growth of the cavitation bubbles will occur upstream of the atomizing means. Growth of the cavitation bubbles is produced by one or more pressure reducing means and also by the pressure drop in the fluid, as it flows downstream to the atomizing means. A continued pressure drop, even if only slight, assists in stabilizing the bubbles. Additional growth of the cavitation bubbles occurs as the fluid passes through the atomizing means and into the lower pressure atomizing zone, in which it rapidly vaporizes. Passing the so-formed two-phase fluid through the atomizing means also produces shear between the vapor (the cavitation bubbles) and liquid phases, which increases the surface area of the liquid, as reflected in the formation of ligaments, membranes, smaller globules, etc. The atomization produces a spray of liquid droplets into the lower pressure atomizing zone. This is explained in detail below. By pressure is meant a low pressure reducing means, such as one or more static mixers in the fluid line upstream of the atomizing means. By low pressure is meant that the static mixer(s) or other pressure reducing means produces, in the flowing fluid, a pressure drop less than 50 psi, preferably less than 15 psi and more preferably no greater than 5 psi upstream of the atomizing means, with a typical pressure drop ranging from 1 to 5 psi. Cavitation is a phenomena in which a pressure drop induces bubble formation in a liquid, at a temperature below the bubble point of the liquid. Thus, cavitation occurs by reducing the pressure, while maintaining a constant temperature. This is in contrast to boiling enhanced atomization, in which bubble nucleation is induced by increasing the temperature of the fluid above the bubble point, while maintaining the pressure constant. The cavitation liquid is soluble in the liquid to be atomized at the process conditions and either has a lower boiling point than the liquid to be atomized or contains sufficient material boiling below the boiling range of the liquid to be atomized, to form bubbles which grow and expand for the atomization. Typically this means that at least 0.5 wt. %, preferably at least 1.0 wt. % and more preferably greater than 1.0 wt. % of the cavitating liquid will be vaporized during the initial bubble formation and subsequent atomization of the liquid to be atomized. Thus, the fluid produced by mixing the cavitating liquid with the liquid to be atomized, is preferably a single phase liquid mixture or solution, as opposed to two liquid phases or an emulsion.

The process of the invention is useful for atomizing a wide variety of liquids, including chemical and refinery process liquids, such as atomizing a hot FCC feed oil into a cat cracking reaction zone, using a lower boiling hydrocarbon as the cavitation liquid. In, for example, an FCC process, a two-phase mixture of an FFC oil feed liquid and an atomizing agent comprising steam flows through a feed injector which terminates at its downstream end in an atomizing means comprising an atomizing orifice. The downstream side of the atomizing orifice opens downstream into a spray distributor, as is known. In the practice of the invention, a cavitating fluid, comprising one or more lower boiling hydrocarbons or lower boiling hydrocarbon fractions, is mixed with the hot oil either upstream of the injector or within the injector, to form the fluid solution which, at this point, is a liquid. The injector typically comprises one or more conduits for flowing one or more liquids through and terminates at its downstream end in an atomizing means. The liquid solution of FCC feed oil and the one or more cavitating liquids is maintained at a pressure and temperature, such that cavitation preferably does not occur until the flowing fluid contacts one or more pressure reducing means in the injector, to produce a pressure drop in the fluid and thereby induce nucleation and growth of bubbles comprising the vapor of the cavitating fluid(s) dissolved in the hot oil. This bubble nucleating pressure drop may be as much as one-third of the pressure drop of the fluid through the injector and into the FCC cat cracking zone, as an oil spray comprising droplets of the atomized oil. The pressure drop inducing means is located upstream of the atomizing means. Such means will preferably include one or more static mixing means located in the fluid conduit upstream of the atomizing means. In one embodiment, a plurality of such means may be located in the fluid conduit so that the flowing fluid successively contacts more than one such means as it flows downstream to the atomizing means. This embodiment will produce bubble nucleation and growth in the oil feed as it approaches the atomizing means. The fluid pressure upstream of the pressure drop means is preferably maintained sufficiently high to prevent bubble nucleation and this means a pressure greater than the vapor pressure or bubble nucleation pressure of the solution at the design temperature. The pressure in the atomizing zone is greater than the vapor pressure of the liquid to be atomized, but lower than the vapor pressure of the cavitating fluid and preferably sufficiently lower to further promote and ensure rapid vaporization or flashing of the cavitating liquid to assist in forming the spray of liquid droplets. At any given temperature, the greater the pressure differential between the pressure in the atomizing zone and the vapor pressure of the cavitating fluid in the atomizing zone, the more rapid and violent will be its expansion, which translates into a smaller average droplet size of the atomized liquid. The atomizing orifice may comprise the upstream entrance of a controlled expansion atomizing zone, such as the fan-shaped distributor of the type disclosed in U.S. Pat. No. 5,173,175 which provides a fan-shaped spray of the atomized liquid into the FCC cat cracking reaction zone. The orifice may also comprise a shaped slot at the end of a conduit, for providing a more or less fan-shaped spray as disclosed, for example, in U.S. Pat. Nos. 4,784,328 and 5,289,976. Other embodiments will be explained in detail below.

The process of the invention is useful for atomizing any liquid, including aqueous liquids as well as hydrocarbonaceous liquids. In the case of water, for example, the cavitating liquid may be acetone, methanol and the like. When used in connection with an FCC cat cracking process, the practice of the invention reduces and preferably eliminates the use of steam for feed atomization and the concomitant sour water production, clean-up and disposal. It also reduces and preferably eliminates the use of a hydrocarbon gas (e.g., $C_1$–$C_5$) to form a two-phase fluid for atomization. In addition, the use of the liquid phase process of the invention eliminates the hydraulic hammering and piping vibration problems associated with conventional gas-liquid phase fluid atomization. In a more detailed embodiment relating to FCC feed atomization, the invention comprises a fluid cat cracking process which comprises the steps of:

(a) contacting a flowing fluid, under pressure and comprising a solution of FCC feed oil and a cavitating liquid which comprises one or more hydrocarbon liquids or fractions containing material which boils below the boiling range of said oil feed, with a pressure drop means to reduce the pressure of said flowing fluid and produce nucleation of bubbles comprising vapor of said cavitating liquid at a temperature below the bubble point of said solution, to form a two-phase fluid comprising said bubbles and liquid solution;

(b) passing said two-phase fluid downstream into and through an atomizing means into an atomizing zone which is at a pressure lower than that of said fluid upstream of said atomizing means, to atomize said fluid and form a spray comprising liquid droplets of said feed oil, wherein said atomizing zone comprises a cat cracking reaction zone, and (c) contacting said spray with a particulate, hot, regenerated cracking catalyst in said reaction zone at reaction conditions effective to catalytically crack said feed oil and produce lower boiling hydrocarbons.

The lower boiling hydrocarbons produced by the cracking reaction are separated from the spent catalyst particles, in a separation zone, are recovered and then typically sent to further processing, including fractionation. The cracking reaction also produces spent catalyst particles, which contain strippable hydrocarbons and coke, as is known. The spent catalyst particles are stripped in a stripping zone, to remove the strippable hydrocarbons to produce stripped, coked catalyst particles. The stripped, coked catalyst particles are passed into a regeneration zone, in which they are contacted with oxygen, at conditions effective to burn off the coke and produce the hot, regenerated catalyst particles, which are then passed back up into the reaction zone. The reaction zone of an FCC cat cracking process usually comprises a riser and is known as a riser reaction zone.

DETAILED DESCRIPTION

Figure 1A:
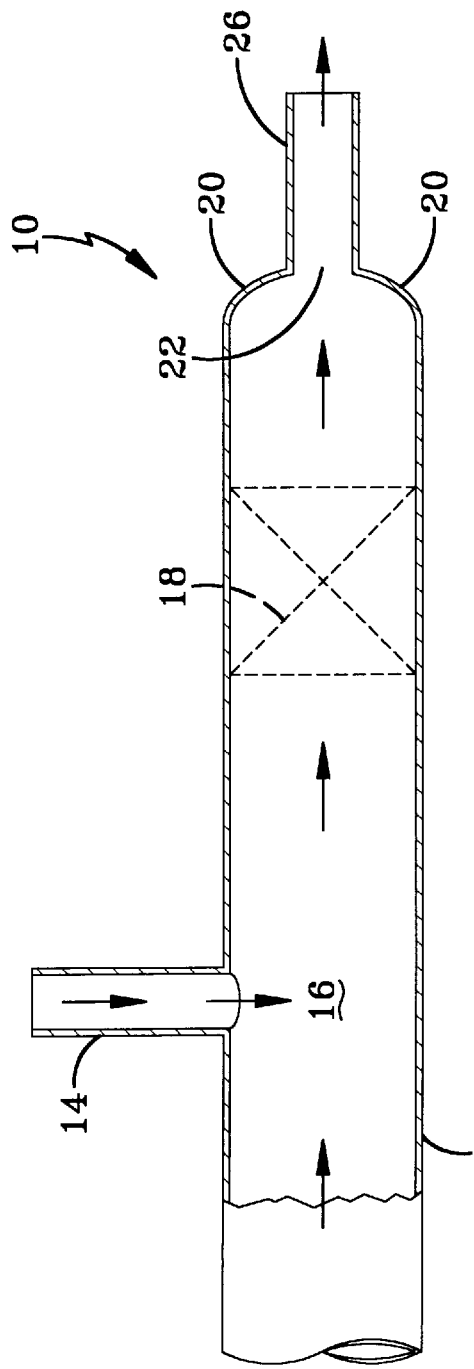
FIGS. 1(a) and 1(b) are simplified side and plan view schematic illustrations of an FCC feed injection unit useful in the practice of the invention.
Figure 1B:
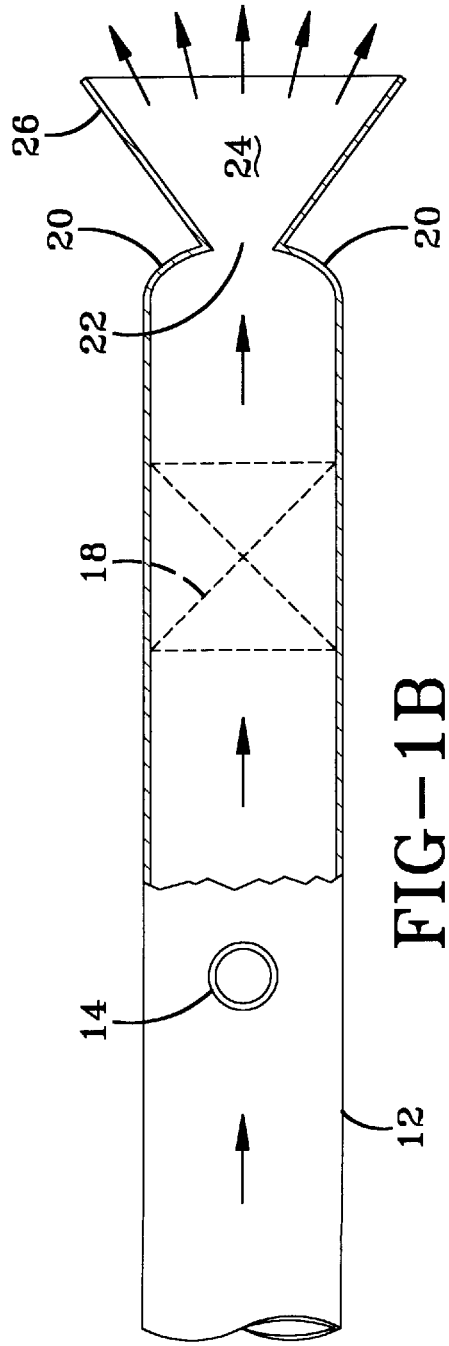

The fluid passing through the atomizing means, which typically comprises an atomizing orifice, having a cross-sectional area perpendicular to the fluid flow direction smaller that that of the fluid flow conduit upstream, as further described below, is a two-phase fluid comprising a gas phase and a liquid phase. The gas phase comprises cavitation liquid vapor and the liquid phase comprises a solution of the cavitation liquid and the liquid to be atomized. The two-phase fluid passing through the atomizing means may be gas-continuous or liquid-continuous, or it may be a bubbly froth, in which it may not be known with certainty if one or both phases are continuous. This may be further understood with reference to, for example, an open cell sponge and a closed cell sponge. Sponges typically have a 1:1 volumetric ratio of air to solid. An open cell sponge is both gas (air) and solid continuous, while a closed cell sponge is solid continuous and contains discrete (dispersed) gas cells. In an open cell sponge, the solid can be said to be in the form of membranes and ligaments (such as may exist in a two-phase gas-liquid froth or foam). In a closed cell sponge, the gas can be envisioned as in the form of a dispersion of discrete gas globules in the solid. Some sponges fall in-between the two, as do some two-phase fluids comprising a gas phase and a liquid phase. It is not possible to have a sponge that is gas continuous and not also solid continuous, but it is possible to have a two-phase gas and liquid fluid that is gas continuous only. Therefore, the particular morphology of the fluid as it is passed into and through the atomizing means, may not be always known with certainty. Irrespective of this, there must be sufficient vapor present in the fluid entering the atomizing means, for the shear (and any other mixing upstream of the orifice, but downstream of the bubble nucleation) mixing to increase the kinetic energy of the fluid, by increasing the surface area of the liquid phase. This is reflected in reducing (i) the thickness of any liquid membranes, (ii) the thickness and/or length of any liquid ligaments or rivulets, and (iii) the size of any liquid globules in the fluid, either before or during the atomization. In the practice of the invention, it is preferred that the fluid passed through the atomizing means, to form the spray of oil droplets, comprise mostly cavitating fluid vapor on a volumetric basis (e.g., a volumetric vapor to liquid ratio of at least 2:1). A single phase fluid (e.g., liquid) passed through the nozzle, will have its kinetic energy increased. With a two-phase fluid comprising a vapor phase and a liquid phase, the vapor velocity may be increased relative to the velocity of the liquid phase, (i) in mixing zones between the bubble nucleation and pressure drop means, (ii) when the fluid passes through an atomizing orifice of smaller cross-section, perpendicular to the fluid flow direction, than the fluid conduit means upstream of the orifice (a pressure-reducing orifice). This velocity differential between the vapor and liquid phases is believed to result in ligamentation of the liquid, particularly with a viscous liquid, such as a hot FCC feed oil. By ligamentation is meant that the liquid forms elongated globules or ligaments which are sometimes referred to as rivulets. The atomizing zone is at a lower pressure than the pressure upstream of the atomizing orifice. Consequently, the vapor in the fluid passing through the atomizing orifice rapidly expands, thereby further shearing, squeezing and dispersing the liquid ligaments and/or droplets into the atomizing zone. Any ligaments typically break into two or more droplets during the atomization.

Referring to FIGS. 1(*a*) and 1(*b*), an FCC feed injection unit 10 comprises a hollow, liquid feed conduit 12, through which a hot, liquid FCC oil feed is passed from an upstream source. At the same time, a cavitation liquid comprising a lower boiling hydrocarbon liquid is passed down into the conduit 12 via line 14, which intersects the conduit at the tee joint, as shown. The cavitation liquid is injected into the flowing hot oil, with it mixes, to form a liquid solution comprising both liquids, in the vicinity of zone 16. This mixing to form the fluid solution, is shown here as occurring in the fluid conduit upstream of the pressure drop means 18, for the purposes of illustrating one embodiment of the invention. However, such mixing may be achieved further upstream and even outside of the feed injector, if desired. The pressure in the conduit is sufficient to maintain the cavitating fluid in the liquid state, so that the so-formed mixture is essentially all liquid. This fluid mixture progresses downstream (from left to right) and passes through a low pressure drop static mixer 18, which induces bubble nucleation. The so-formed fluid mixture having nucleated microbubbles, continues downstream in the conduit to an atomizing orifice 22, smaller in cross-section than that of the conduit. By cross-section is meant the cross-sectional area of the conduit ($\pi r^2$ for a cylindrical conduit) and the cross-sectional area of the atomizing orifice perpendicular to the fluid flow direction. Preferably, the wall of the conduit terminates into the orifice by means of an arcuate or curved surface, 20, which converges the flowing fluid stream into the atomizing orifice with minimal coalescence, which might otherwise occur if the fluid impinged onto the end of the conduit. The downstream side of atomizing orifice 20, is contiguous with, and opens into a hollow, fan-shaped spray distributor 26 containing cavity 24. Cavity 24 comprises the controlled expansion zone, to create a fan-shaped spray of the atomized feed droplets. The pressure downstream of the atomizing orifice is sufficiently lower than the pressure on the upstream side in the conduit, for the cavitating fluid to flash or rapidly vaporize to atomize the FCC feed liquid into droplets in the controlled expansion atomization zone 24. The embodiment shown, of the conduit terminating by means of an arcuate surface into the atomizing orifice, along with the fan-shaped controlled expansion zone, is disclosed and claimed in U.S. Pat. No. 5,173,175. However, other atomizing orifice and nozzle configurations may also be used, such as those disclosed, for example, in U.S. Pat. Nos. 4,784,328 and 5,289,976 and the like.

An important and essential feature of the invention resides in nucleating, in the liquid to be atomized, bubbles comprising cavitating fluid vapor by pressure drop means, and preferably upstream of the atomizing orifice. More preferably it will be advantageous to permit the nucleated bubbles to grow by, i.e., additional pressure drop inducing means upstream of the atomizing means. The pressure drop means preferably comprises one or more static mixers, to provide the desired bubble nucleation with a minimal pressure drop. If the two liquids, the feed and cavitating liquid, are merely mixed together and then passed through an atomizing means without bubble nucleation, the bubble expansion and vaporization will be slower and the desired degree of atomization of the feed liquid will not be achieved. The pressure drop across one or more static mixers upstream of the atomizing means and concomitant agitation of the so-formed bubble containing solution, initiates bubble nucleation and preferably bubble nucleation and growth, so that expansion of the bubble vapor is much more rapid across the atomizing orifice, and feed atomization is therefore enhanced. By analogy, if a bottle of soda is opened without agitation, foaming either does not occur or occurs slowly. If the soda is agitated before opening, rapid and violent foaming occurs when the bottle is opened and the pressure is released. Shaking of the bottle allows the soda to be sprayed out as a spray or mist, due to the rapid bubble growth across the opening where the pressure reduction occurs. In the present invention, the reduction in pressure and agitation produced by the upstream mixer causes bubble nucleation just as shaking the soda, and the resulting fine atomization of the feed can be accomplished by the subsequent depressurizing and the cavitating mechanism described, rather than by the two phase shearing, as with conventional atomization nozzles. The bubble nucleating means is preferably designed and/or selected to produce the smallest pressure drop necessary to vaporize a small fraction, which is less than half and preferably less than one-third. of the cavitating liquid to provide bubble nucleation, with the major portion of the pressure drop occurring across the atomization nozzle, to generate the atomized spray.

With respect to the above illustrations and the Example below, FCC processes are well known and need not be described in detail here. Cat cracker feeds used in FCC processes typically include gas oils, which are high boiling, non-residual oils, such as a vacuum gas oil (VGO), a straight run (atmospheric) gas oil, a light cat cracker oil (LCCO) and coker gas oils. These oils have an initial boiling point typically above about 450° F. (232° C.), and more commonly above about 662° F. (350° C.), with end points up to about 1150° F. (621° C.), as well as straight run or atmospheric gas oils and coker gas oils. In addition, one or more heavy feeds having an end boiling point above 1050° F. (e.g., up to 1300° F. or more) may be blended in with the cat cracker feed. Such heavy feeds include, for example, whole and reduced crudes, resids or residua from atmospheric and vacuum distillation of crude oil, asphalts and asphaltenes, tar oils and cycle oils from thermal cracking of heavy petroleum oils, tar sand oil shale oil, coal derived liquids, syncrudes and the like. These may be present in the cracker feed in an amount of from about 2 to 50 volume % of the blend, and more typically from about 5 to 30 volume %. These feeds typically contain too high a content of undesirable components, such as aromatics and compounds containing heteroatoms, particularly sulfur and nitrogen. Consequently, these feeds are often treated or upgraded to reduce the amount of undesirable compounds by processes, such as hydrotreating, solvent extraction, solid absorbents such as molecular sieves and the like, as is known. Typical cat cracking conditions in an FCC process include a temperature of from about 800–1200° F. (427–648° C.), preferably 850–1150° F. (454–621° C.) and still more preferably 900–1150° F. (482–621° C.), a pressure between about 5–60 psig, preferably 5–40 psig with feed/catalyst contact times between about 0.5–15 seconds, preferably about 1–5 seconds, and with a catalyst to feed ratio of about 0.5–10 and preferably 2–8. The FCC feed is preheated to a temperature of not more than 850° F., preferably no greater than 800° F. and typically within the range of from about 600–800° F.

The invention will be further understood with reference to the examples below.

EXAMPLES

Example 1

Figure 2:
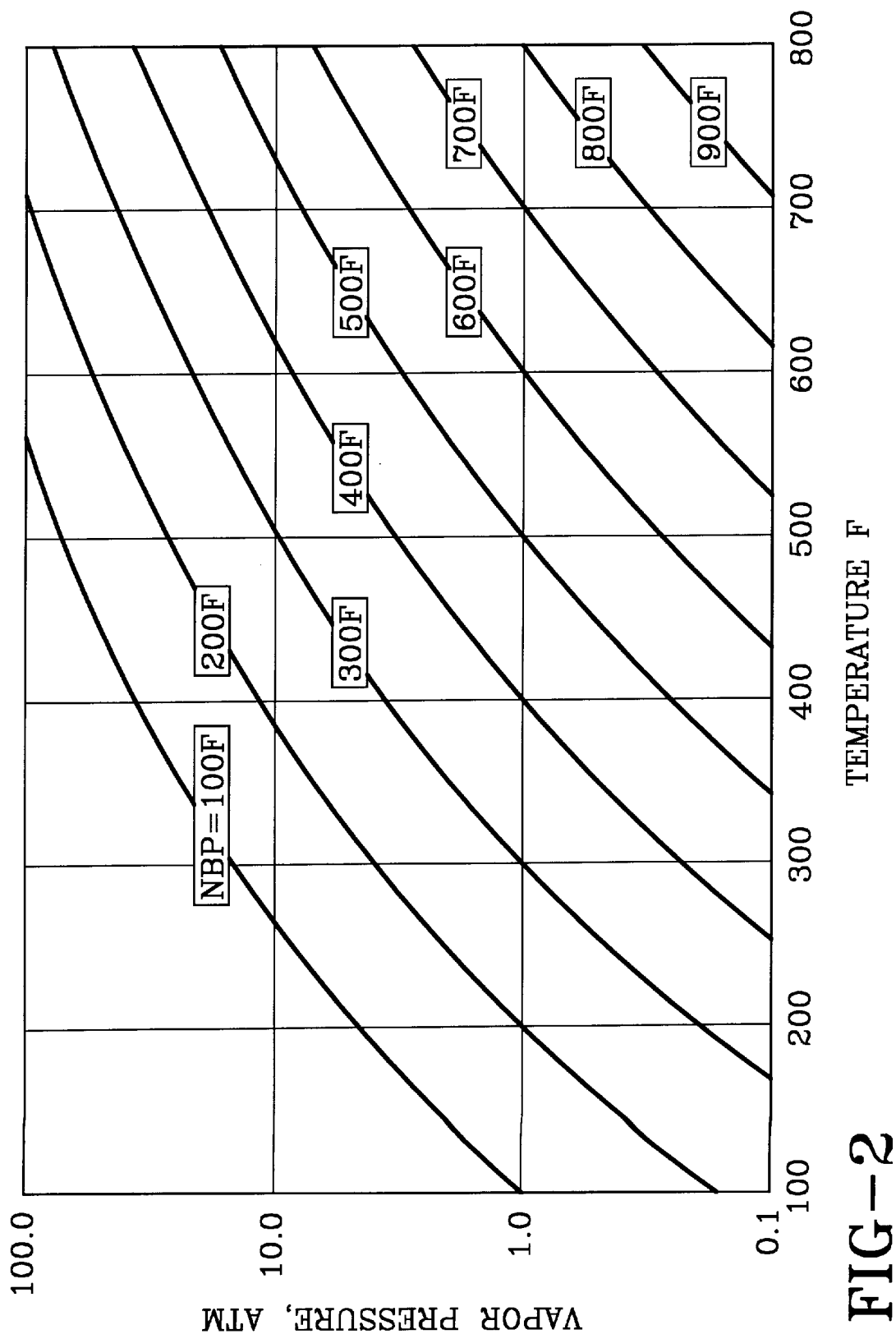
FIG. 2 is a graph of vapor pressure as a function of temperature for saturated hydrocarbon cavitating fluids.

The lower boiling cavitating fluid must be soluble in, and compatible with, the liquid to be atomized and with any upstream processes conditions for each specific application. By way of an illustrative example specifically for the practice of the invention for atomizing the liquid oil feed to an FCC unit, reference is made to a vapor pressure graph for hydrocarbons, shown in FIG. 2. For the purposes of this example, this graph is a simplified version of the one disclosed by Maxwell and Bonnell, in an article titled Derivation and Precision of a New Vapor Pressure Correlation for Petroleum Hydrocarbons, which appeared in Industrial and Engineering Chemistry, v.49, pages 1187–1196 (1957). The pressure in the fluid conduit upstream of the atomizing orifice is assumed to be 7 atmospheres and the pressure on the downstream side of the orifice, in the atomization zone, is assumed to be 3 atmospheres. For an upstream temperature of 750–800° F., the cavitating liquid must be a liquid at 7 atmospheres and a vapor at 3 atmospheres. This suggests that a normal boiling point between 600 and 650° F. is required for the cavitating liquid, although the nominal boiling point for this cavitating liquid would be adjusted based on the planned treat rate, as well as considering the boiling range and miscibility of the fluid with the process feed. In this example, the cavitating liquid could be a distillate fraction produced from the FCC process or it could be obtained from another source. A blend of 1–5 wt. % of the distillate, based on the FCC feed, will generate a two phase volume expansion of 1.7–4.3 times the liquid feed volume, with a temperature drop of between 1–7 degrees, from an adiabatic flash. If the upstream conditions are changed to 7 atmospheres and 400–450° F., the required boiling range for the cavitating fluid is approximately 290–315° F. Similarly, for differing upstream and downstream pressures, and differing FCC feed preheat temperatures, an optimum cavitating fluid boiling range can be defined.

Example 2

Simple comparative experiments using an aqueous acetone solution were conducted to demonstrate cavitation-enhanced atomization. Sharp angle orifice plates were used for the atomizing means, which in these experiments were bores in the plates and their length to diameter (L/D) ratios were 1.4:1 and 7:1. Both were cylindrical bores having an inner diameter of 350 μm, with the plate thickness determining the L/D ratio. The main components of the experimental setup were a pressure vessel, a heated liquid hose, a monosize drop generator, and a heated air chamber purged with flowing nitrogen at atmospheric pressure. The atomizing pressure was measured in the pressure vessel. Images of the break-up of the fluid exiting each orifice and spray patterns were taken with a Greenfield Speedview 700 imaging system. Droplet images of the sprays were taken with a CCD camera. In every case, the orifice opened into the heated air chamber at the downstream side. The temperature in the chamber was identical to the liquid temperature, to minimize fluid temperature changes due to the atomization and evaporation.

Blank experiments with water at a temperature below the boiling point at the atomizing pressure upstream of the orifice plate, with a pressure drop of 30 psi across the orifice, indicated that the orifice having the greater L/D ratio of 7:1, performed better than the shorter one having the 1.4:1 L/D ratio. However, fine sprays could not be obtained with either L/D ratio when the water temperature was lower than the boiling point at the atomizing pressure. Increasing the water temperature to above its bubble nucleation temperature resulted in a fine spray in some cases. Thus, with the single liquid alone (water), bubble nucleation by cavitation did not occur and the water had to be heated above its boiling point to produce bubble nucleation.

In contrast, a similar set of runs using a solution of 6.8 mole % acetone in water resulted in cavition-induced bubble nucleation and fine sprays, at the same 30 psi pressure drop across the orifice having the L/D ration of 7:1. The orifice having the L/D ratio of 1.4:1 did not produce as fine a spray. In these runs, the temperature of the acetone solution inside the chamber was 98° C., which was below the bubble point of 104° C. for this acetone solution. For the case of the short nozzle or orifice having an L/D ratio of only 1.4:1, substantially all of the 30 psi pressure drop occurred at the exit edge of the orifice. For the long nozzle having the L/D ratio of 7:1, a portion of the pressure drop took place inside the nozzle. These experiments demonstrate that, the extra pressure drop incurred in the longer nozzle having the L/D ratio of 7:1, produced stable cavitation bubbles inside the nozzle or orifice bore.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains. Thus, the invention can be combined with processes that use preformed gas or vapor to form a two-phase gas and liquid fluid which is contacted with one or more mixing means to induce bubble formation of the cavitating fluid. It may also be combined with processes that initiate bubble nucleation by temperature increase.

What is claimed is:

1. A liquid atomizing process which comprises contacting a flowing fluid comprising a solution of the liquid to be atomized and a lower boiling cavitating liquid, under pressure and at a temperature below the bubble point of said solution, with a pressure reducing means to reduce said fluid pressure and thereby produce bubble nucleation to form a two-phase, vapor and liquid fluid comprising said bubbles and said solution, and then passing said two-phase fluid downstream and through an atomizing means into a lower pressure atomizing zone, to atomize said fluid and form a spray comprising droplets of said liquid.

2. A process according to claim 1 wherein said bubbles also grow in size upstream of said atomizing means.

3. A process according to claim 2 wherein said pressure drop produced by said pressure reducing means is less than 50 psi.

4. A process according to claim 3 wherein said pressure reducing means comprises at least one static mixer means.

5. A process according to claim 4 wherein at least 0.5 wt. % of said cavitating liquid is vaporized by said bubble nucleation and subsequent fluid atomization.

6. A process according to claim 5 wherein said atomizing means comprises an atomizing orifice.

7. A process according to claim 6 wherein said pressure drop produced by said pressure reducing means is less than 15 psi.

* * * * *